(12) United States Patent
Kratochvil et al.

(10) Patent No.: US 12,438,364 B2
(45) Date of Patent: Oct. 7, 2025

(54) METHOD FOR OPERATING AN ENERGY SUPPLY SYSTEM, DEVICE FOR EXCHANGING ELECTRICAL POWER IN AN ENERGY SUPPLY SYSTEM, AND ENERGY SUPPLY SYSTEM

(71) Applicant: SMA Solar Technology AG, Niestetal (DE)

(72) Inventors: Marcel Kratochvil, Kassel (DE); Alexander Unru, Baunatal (DE)

(73) Assignee: SMA Solar Technology AG, Niestetal (DE)

( * ) Notice: Subject to any disclaimer, the term of this patent is extended or adjusted under 35 U.S.C. 154(b) by 0 days.

(21) Appl. No.: 18/389,971

(22) Filed: Dec. 20, 2023

(65) Prior Publication Data
US 2024/0162705 A1    May 16, 2024

Related U.S. Application Data

(63) Continuation of application No. PCT/EP2022/066688, filed on Jun. 20, 2022.

(30) Foreign Application Priority Data
Jun. 24, 2021   (DE) .................. 10 2021 116 418.4

(51) Int. Cl.
*H02J 1/00* (2006.01)
*H02J 3/38* (2006.01)
*H02J 5/00* (2016.01)

(52) U.S. Cl.
CPC ............... *H02J 1/002* (2020.01); *H02J 3/38* (2013.01); *H02J 5/00* (2013.01); *H02J 2300/26* (2020.01)

(58) Field of Classification Search
CPC ...... H02J 1/002; H02J 3/38; H02J 5/00; H02J 2300/26; H02J 2207/40; H02J 2300/22; H02J 2300/40
See application file for complete search history.

(56) References Cited

U.S. PATENT DOCUMENTS

| | | |
|---|---|---|
| 11,239,663 B2 | 2/2022 | Chen et al. |
| 11,787,522 B2 | 10/2023 | Schulz et al. |
| 2007/0077830 A1 | 4/2007 | Rzadki et al. |
| 2017/0353123 A1 | 12/2017 | Kang et al. |
| 2018/0345792 A1 | 12/2018 | Liu et al. |

FOREIGN PATENT DOCUMENTS

| | | |
|---|---|---|
| CN | 111244933 A | 6/2020 |
| DE | 10353967 A1 | 7/2005 |
| DE | 102015109967 A1 | 12/2016 |
| DE | 102018219711 A1 | 5/2020 |

OTHER PUBLICATIONS

International Search Report dated Sep. 15, 2022 for International Application No. PCT/EP2022/066688.

*Primary Examiner* — Daniel Cavallari
(74) *Attorney, Agent, or Firm* — Eschweiler & Potashnik, LLC

(57) ABSTRACT

The disclosure relates to a method for operating an energy supply system, wherein a first and a second DC unit exchange power with an AC bus using a first and a second power converter. With transmission using a transformer, this power is combined and converted using a third power converter into a DC grid power of a DC grid and/or vice versa.

17 Claims, 5 Drawing Sheets

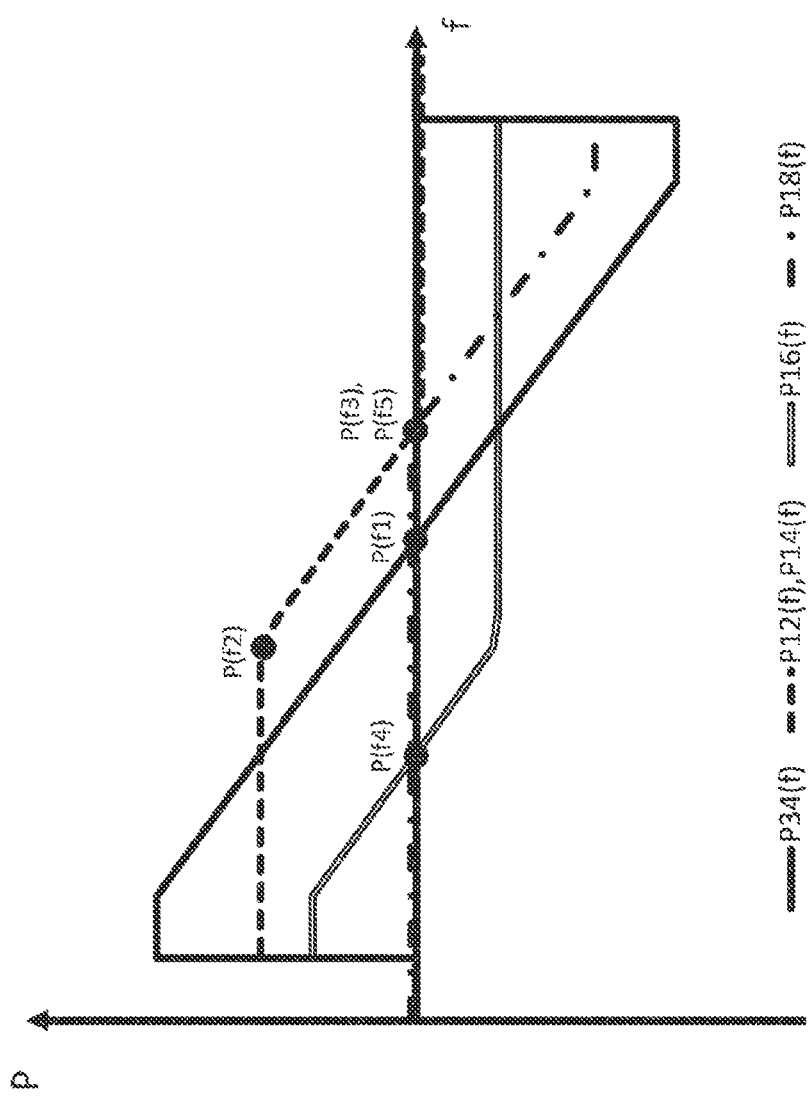

METHOD FOR OPERATING AN ENERGY SUPPLY SYSTEM, DEVICE FOR EXCHANGING ELECTRICAL POWER IN AN ENERGY SUPPLY SYSTEM, AND ENERGY SUPPLY SYSTEM

REFERENCE TO RELATED APPLICATIONS

This application is a Continuation of International Application number PCT/EP2022/066688, filed on Jun. 20, 2022, which claims the benefit of German Application number 10 2021 116 418.4, filed on Jun. 24, 2021. The contents of the above-referenced Patent applications are hereby incorporated by reference in their entirety.

FIELD

The application relates to the exchange of electrical power in an energy supply system having a DC grid via which the electrical power is exchanged with DC consumers and which is at least partially supplied with electrical power from a DC source.

BACKGROUND

Electrical direct current grids, hereinafter referred to as DC grids, are increasingly used to supply systems with a plurality of consumers, for example what are known as industrial DC grids. DC grids can be fed from an electrical alternating current grid, hereinafter referred to as an AC grid, e.g., from a superordinate energy supply grid. As DC grid users, various DC consumers and DC sources can be connected to the DC grid via suitable DC branches. DC consumers and DC sources are DC voltage units that consume (DC consumers) or deliver (DC sources) electrical DC voltage. Examples of DC sources are DC energy generation units, e.g., PV systems, or batteries, which can also be operated either as DC sources or as DC consumers. Depending on which grid user is to be specifically connected to a DC branch, a DC branch can be protected via two-pole fast semiconductor switches for line protection in the event of a short circuit or ground fault. Additionally or alternatively, DC fuses can also be provided.

In a DC grid, it may be necessary for safety reasons to couple certain DC units, i.e., certain DC sources such as energy generation units and/or certain DC consumers, to the DC grid in a galvanically isolated manner. In the case of a plurality of DC units to be correspondingly galvanically isolated individually, this means considerable effort, for example, due to the fact that galvanic isolation must be provided in each corresponding DC branch.

Photovoltaic (PV) systems as energy-generating DC sources or stores, such as batteries, as energy-absorbing and energy-delivering DC units can in principle also be connected to the DC grid via non-isolating DC/DC converters, although a DC/DC converter suitable for this purpose should have leakage current detection for safety reasons and may have to determine the insulation resistance of the connected PV system.

In order to prevent, from the outset, the insulation resistance of the DC grid as a whole against the ground potential from being influenced by the PV system and/or by the store or its lines, the PV generators or stores can also be connected to the DC grid via insulating DC/DC converters, wherein the insulating DC/DC converters involve galvanic isolation between the DC grid and the DC unit. In this case, each connected PV generator then requires its own regular isolation monitoring.

In addition, galvanic isolation of a DC unit from the DC grid may be required for other reasons, e.g., if the maximum possible voltage of a connected PV generator against the ground potential exceeds the permissible conductor-to-ground voltage of the DC grid, if the PV system would generate an impermissible asymmetry of the DC grid against the ground potential in case of galvanic coupling to the DC grid, and/or if a leakage current limit of the DC grid would be exceeded regularly or even sporadically due to a galvanically coupled PV system.

In addition, the length of the DC lines and thus the distance of the DC units from the DC grid is generally limited for technical reasons. However, a PV system as a DC unit that is designed as a free-field or rooftop system may be located correspondingly far away from a possible connection point to the DC grid, so that the PV system would have to be connected over long distances with DC/PV cables suitable for this purpose. The same can apply to stores, in particular if they have a large capacity and have to be located away from the DC grid of a production facility or the like, e.g., for safety reasons. Such a connection of a DC unit by means of DC lines can therefore be expensive and inefficient, in particular for DC units that have large and extensive PV generators and/or powerful stores.

SUMMARY

The application is directed to the supply of electrical power from a DC source to a DC grid, and to coupling PV systems or stores to a DC grid without influencing the behavior of the DC grid with respect to ground.

A method for operating an energy supply system having at least one energy generation unit comprises: exchanging electrical power between a first DC unit and an AC bus by means of a first power converter, wherein a first DC power of the first DC unit is converted to a first AC power using the first power converter and/or vice versa, exchanging electrical power between a second DC unit and the AC bus by means of a second power converter, wherein a second DC power of the second DC unit is converted to a second AC power using the second power converter and/or vice versa, combining the first AC power and the second AC power into an AC bus power of the AC bus, transmitting the AC bus power using a transformer, exchanging electrical power between the AC bus and a DC grid by means of a third power converter, wherein the AC bus power transmitted by the transformer is converted using the third power converter into a DC grid power and/or vice versa.

The first, the second and the third power converter can be configured as bidirectional AC/DC converters that transmit electrical power from their AC side to their DC side and/or vice versa.

At least the first DC unit is formed as an energy generation unit, for example, a PV system having at least one PV generator. A frequency and an amplitude of the AC voltage and/or of the AC current on the AC bus are set by the method. For example, the third power converter can stabilize the amplitude of the AC voltage by setting the DC grid power as a function of the AC bus power. In this case, the frequency on the AC bus can be set by the third power converter to produce a power balance between the DC power of the DC units fed into the AC bus as AC power and the DC grid power dissipated from the AC bus via the third power converter. The third power converter can use the set frequency on the AC bus to set the DC power of the DC units fed into the AC bus and thus the AC bus power to correspond to the DC grid power. In addition, the third power converter can selectively change the DC grid power, creating a power imbalance in the AC bus, and modify the frequency in the AC bus. The DC units can set their respective DC power as a function of the frequency in the AC bus. Feedback between frequency on the AC bus and resulting DC grid power can thus result in a control loop that has largely automatic operation and the advantage of being simple to implement in terms of control technology, for example, using corresponding P(f) characteristics, which specify the dependence of the DC power of the DC units on the frequency on the AC bus.

Alternatively or additionally, f(P) regulation can be used in the third power converter. In this case, the third power converter responds to any power imbalance with a change in frequency, which in turn can cause a change in the DC power of individual DC units. For example, a change in irradiance on the PV generator can be compensated for by an increase in power from another DC unit, for example, comprising a store, before it is necessary to respond with a change in DC grid power. This allows the power balance to be restored and the frequency in the AC bus to be set to a setpoint.

In one embodiment, the first power converter operates the first DC unit at an operating point of maximum power and converts the first DC power into a first AC current. The first power converter feeds the first AC current into the AC bus, wherein the first AC current follows the AC voltage in the AC bus. For the operation of a PV system, it is expedient to operate the PV generator or generators at the operating point of maximum power, also called MPP, as far as possible, in order to maximize the yield. The task of finding this operating point of maximum power and operating the PV generators at this point can be performed by what is called an MPP tracker, which can be installed in the first power converter.

In one embodiment, the second DC power is generated, stored and/or consumed by the second DC unit. In this case, the second DC power is converted into a second AC current by the second power converter and fed into the AC bus, wherein the second AC current follows the AC voltage in the AC bus. The second DC unit may be, for example, a further DC energy generation unit, for example, a further PV system, a DC consumer, such as an electrolyzer, or a DC store, for example, a battery. The second power converter can be configured to operate the second DC unit at a settable operating point, for example at the operating point of maximum power of a PV generator or at an operating point of maximum efficiency of an electrolyzer; in the case of a store as the second DC unit, the power exchange with the store can be set by the second power converter.

In one embodiment, the DC grid power is generated, stored and/or consumed by DC grid users connected to the DC grid. The DC grid power fed into the DC grid by the third power converter may in this case differ from the sum of the powers of the DC grid users. Any power imbalances in the DC grid can be compensated for by connecting the DC grid to an AC grid, for example, to a superordinate energy supply grid with which electrical power can be exchanged by means of a suitable grid exchange converter. This grid exchange converter can be responsible for the stable operation of the DC grid and have appropriate measurement, control and regulation technology as well as sufficient power reserves to operate the DC grid stably with electrical power from the AC grid only, if required.

The safe operation of the DC grid and the DC grid users is not impaired by the connection to the remote DC units. For example, the galvanic isolation of the remote DC units has the effect of decoupling the potentials of the DC grid from any isolation and/or leakage current effects that may occur at the remote DC units. Overall, the present disclosure thus enables simple, cost-effective integration of stores and local energy generation units into the energy supply via a DC grid and proves to be particularly advantageous for use in industrial DC grids that can, for example, supply a factory with power from renewable energy sources.

In one embodiment, the method has an exchange of power between the AC bus and a further DC unit using a further power converter, wherein a further DC power of the further DC unit is converted into a further AC power using the further power converter and/or vice versa. In this case, the further DC power can be generated, stored and/or consumed by the further DC unit. The further DC unit may comprise a further DC energy generation unit, e.g., a further PV system, a DC consumer, such as an electrolyzer, or a DC store, e.g., a battery. The further power converter may in this case be configured to operate the further DC unit at a settable operating point.

The method offers the advantage that the frequency and/or amplitude of the AC voltage and/or of the AC current of the AC bus can be selected relatively freely without being subject to the sometimes strict requirements of a public AC grid. Nevertheless, standard components can be used, e.g., contactors, fuses, monitoring, transformer, etc., which are also suitable for the conventional public AC supply grid. Thus, for example, it is possible to use a conventional transformer for galvanic isolation of the AC bus from the DC grid. It is also possible to ground the transformer used on the AC bus side. In addition, particularly low-loss operation of the power converters is possible by setting the amplitude of the AC voltage on the AC bus, optionally on both sides of the transformer, in the optimum ratio to the amplitude of the DC voltage in the DC grid and optionally on the DC units. Furthermore, the settable parameters of the AC bus, i.e., frequency, voltage and/or reactive power, can be used to control and regulate the electrical power transmission in the energy supply system. By combining suitable characteristics which define dependencies between frequency on the AC bus and exchanged power of the power converters involved, the energy supply system can be operated stably and with reliably predictable power.

A device for exchanging electrical power in an energy supply system having at least one energy generation unit has an AC bus to which a first power converter and a second power converter are connected, wherein the first power converter is configured to convert a first DC power of a first DC unit into first AC power and/or vice versa, and wherein the second power converter is configured to convert a second DC power of a second DC unit into second AC power and/or vice versa. The first and second power converter are each connected on the AC side to an AC bus so that the first and second AC power are transmittable as AC bus power via the AC bus. The device has a transformer which is arranged between the AC bus and an AC side of a third power converter, wherein the transformer is configured to transmit the AC bus power and to provide galvanic isolation. The third power converter is configured to convert the AC bus power transmitted via the transformer into DC grid power and/or vice versa. On a DC side of the third power converter, a DC grid can be connected in which DC grid users can be operated with the DC grid power. At least the first DC unit is formed as an energy generation unit, for example, a PV system having at least one PV generator. The third power converter is configured to set a frequency and an amplitude of the AC voltage on the AC bus. For example, a control circuit or unit of the third power converter can set the frequency on the AC bus as a function of the DC grid power, and the DC grid power as a function of the AC bus power.

The device thus enables a plurality of DC units, for example, energy generation units, stores and consumers, to be coupled on the AC side to an AC bus via respective power converters, e.g., DC/AC converters, and to exchange the electrical power of the DC units collected in the AC bus with the DC grid. The AC bus is in this case galvanically isolated by the transformer and connected to the DC grid by the third power converter.

On the AC bus, the frequency and/or the amplitude of the AC voltage and/or of the AC current can be optimally designed. Optimal in this case can be based on the design of the overall system and also depend on current conditions, e.g., the solar irradiance on a PV system and the DC power currently available as a result. It is also conceivable to make the frequency and/or amplitude in the AC bus variable, at least within limits, and to operate the power converters as a function of the current frequency and/or amplitude in the AC bus, for example, using f(P) and/or P(f) characteristics.

Thus, the DC grid, in which the DC voltage may be substantially fixed, is connected to the AC bus via the third power converter and the transformer. In one embodiment, a plurality of DC sources and/or DC consumers are connected in parallel via respective power converters to the AC bus, which can be operated with optimum frequency and/or amplitude—which can possibly also be variable within limits—of the AC voltage and/or of the AC current, and make their power available to the DC grid via the AC bus, wherein other repercussions on the safe operation of the DC grid are largely avoided.

In one embodiment of the device, the first power converter is configured to operate the first DC unit at an operating point of maximum power and to convert the first DC power into a first AC current and to feed it into the AC bus, wherein the first AC current follows the AC voltage in the AC bus.

In one embodiment of the device, a further DC unit can be connected to the AC bus via a further power converter, wherein the further power converter is configured to convert a further DC power of the further DC unit into a further AC power and/or vice versa. The second and/or the further DC unit can in this case be configured to generate, store and/or consume the respective DC power.

Optionally, the second DC unit may be configured as a further energy generation unit, for example, as a further PV system having at least one further PV generator. Optionally, the second power converter can in this case be configured to operate the second DC unit at an operating point of maximum power and to convert the second DC power into a second AC current and to feed it into the AC bus, wherein the second AC current follows the AC voltage in the AC bus.

In one embodiment of the device, the transformer is grounded on its side connected to the AC bus.

In one embodiment of the device, the controller or control circuit is at least partially implemented by the first, the second and/or the third power converter. The first, the second and/or the third power converter can be implemented as what is known as an active power converter. Active power converters have a bridge circuit in which power semiconductor switches are actively controlled by a controller for electrical power conversion. The controller of the power semiconductor switches and the controller of the device can be implemented on the same hardware. Alternatively or additionally, the controller of the device can be at least partially implemented outside the device. In one embodiment, a controller or control circuit implemented outside the device communicates with the device or the individual power converters via a communication interface.

An energy supply system can have such a device described above. In one embodiment, the energy supply system may further have a first DC unit, formed as a PV system having at least one PV generator. A second DC unit of the device can also be formed as a PV generator or an energy store. DC grid users can be connected to a DC grid of the device for drawing DC grid power. A superordinate AC supply grid can be connected to the DC grid via a grid exchange converter for supplying the DC grid.

In one embodiment, the energy supply system has the controller or control circuit, which is configured to receive a setpoint for the DC grid power and to operate the first power converter, the second power converter and/or the third power converter such that the DC grid power corresponds to the setpoint. A suitable setpoint may comprise an absolute value, for example, a power currently required to supply the DC grid, or have a generic value, for example, retrieve the maximum available regeneratively generated power from the AC bus.

In this case, it is possible to have the DC units and the respective power converters, via which the DC units are connected to the AC bus, interact by means of the controller in such a way that the AC bus as a whole can provide special functions for the DC grid. For example, the DC grid can be provided via the third power converter with what is known as DC regulating power, which is used for voltage stabilization in the DC grid and is exchanged between the DC units and the DC grid via the respective power converters and the AC bus.

Thus, the device makes it possible, for the connection of a PV system, to provide an AC bus which can be operated separately from a public AC supply grid and can therefore be configured in such a way that, on the one hand, standard AC components such as fuses, converters, transformers, residual current detection, load break switches, AC cables and the like can be used and, on the other hand, some requirements for usual public AC supply grids do not necessarily have to be implemented, e.g., the normative specification of a set voltage or set frequency, but can be implemented if required. This can be utilized to achieve the simplest and most efficient structure possible, wherein losses along long DC lines and/or due to inefficient galvanically isolating DC/DC conversion, as well as any disturbing influences of potential shifts or leakage currents on the part of the energy generation units, can be avoided.

This device can save costs and minimize losses in applications where a plurality of DC units, for example, DC sources, are to be galvanically isolated and under certain circumstances connected to a DC grid over longer distances, for example, over several hundred meters.

The transformer for galvanic isolation can be arranged as close as possible to the third power converter, e.g., to have as large a portion of the cabling as possible galvanically isolated from the DC grid.

BRIEF DESCRIPTION OF THE FIGURES

The disclosure is explained in more detail below with the aid of figures.

FIG. 5 schematically shows a graph of a P(f) characteristic of a power converter.

In the figures, identical or similar elements are denoted by the same reference signs.

DETAILED DESCRIPTION

Figure 1:
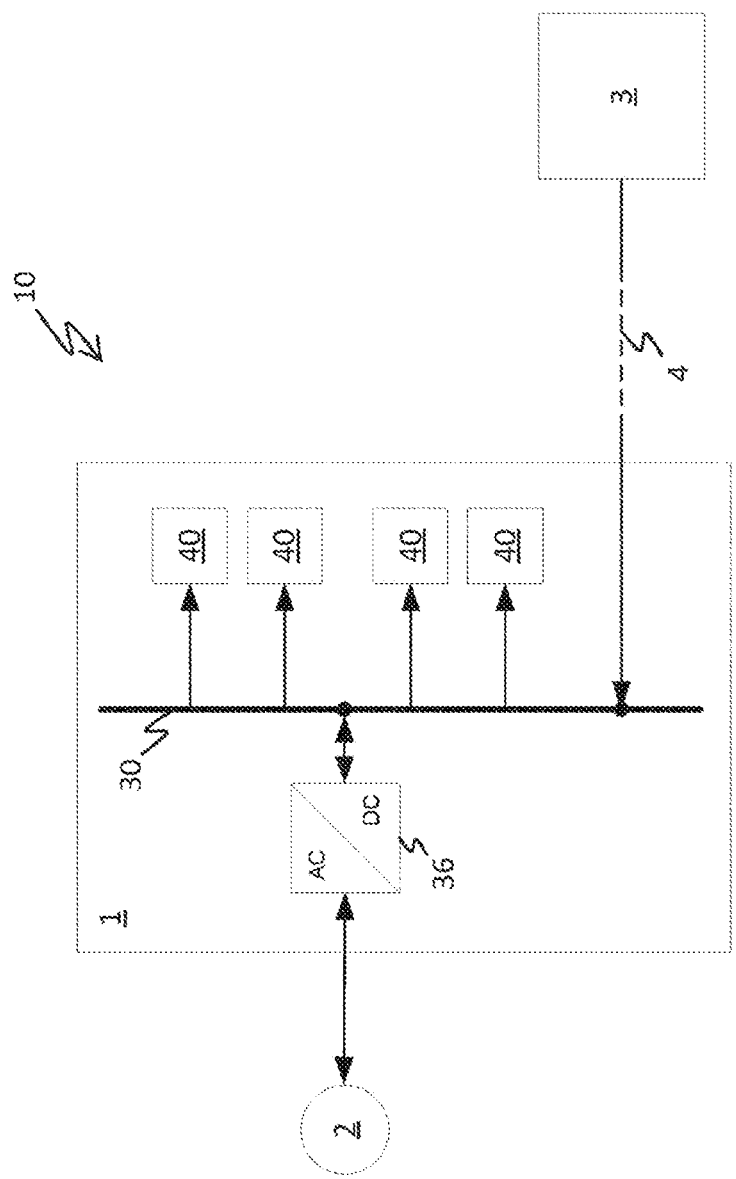
FIG. 1 shows an example of an energy supply system.

FIG. 1 illustrates an example energy supply system 10 comprising a DC section 1, an AC supply grid 2 and an energy generator 3. The energy supply system 10 serves to supply DC grid users 40 in the DC section 1 with electrical power, which is provided via a grid exchange converter 36 from the AC supply grid 2. In this case, the grid exchange converter 36 may draw electrical power from the AC supply grid 2 and feed it into a DC grid 30 to which the DC grid users 40 are connected. For stable operation of the DC grid 30, the grid exchange converter 36 may have a suitable regulation system which, for example, compensates for power imbalances in the DC grid 30 by varying the grid exchange power and thereby keeps the DC voltage in the DC grid 30 within a permissible range.

The energy generator 3 is arranged outside the DC section 1 and is connected to the DC grid 30 via a connection 4. In order to be able to feed electrical power from the energy generator 3 via the connection 4 into the DC grid 30, certain boundary conditions and guidelines must be observed depending on the specific design of the energy generator 3. For example, galvanic isolation between the energy generator 3 and the DC grid 30 may be required for insulation and safety reasons. Depending on the performance of the energy generator 3, its power can provide a portion of the electrical power required in the DC grid 30 and/or completely supply the DC grid 30 with electrical power at least temporarily; any power of the energy generator 3 in excess of this can be fed into the AC supply grid 2 as excess power via the grid exchange converter 36 and/or (temporarily) stored within the energy supply system 10.

Figure 2:
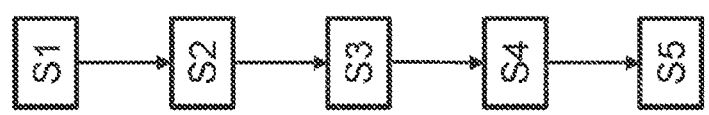
FIG. 2 shows an example of a method for operating an energy supply system.

FIG. 2 schematically shows a method for operating an energy supply system 10. A specific energy supply system 10 having two DC energy generation units as DC units, e.g., two PV systems 22, which form the energy generator 3 and whose power is to reach the DC section 1 via the connection 4, is illustrated by way of example in FIG. 2 or FIG. 3.

The method of FIG. 2 comprises act S1: exchanging power between a first PV system 22 and an AC bus 20 by means of a first power converter 12, wherein a first DC power of the first PV system 22 is converted to a first AC power by means of the first power converter 12 and/or vice versa.

The method further comprises act S2: exchanging power between a second DC unit 22, 26, 28 and the AC bus 20 using a second power converter 14, 16, 18, wherein a second DC power of the second DC unit 22, 26, 28 is converted to a second AC power using the second power converter 14, 16, 18 and/or vice versa. For the example of FIG. 2, the second DC unit may be a second PV system 22. For the example of FIG. 3, the second DC unit may be, for example, the second PV system 22, a battery 26, or a consumer 28, such as an electrolyzer. Further DC units may be, for example, the second or a further PV system 22, the battery 26 or a further battery 26, and/or a consumer 28 and/or a further consumer 28.

The method also comprises act S3: combining the first AC power and the second AC power into an AC bus power of the AC bus 20.

The method also includes act S4: transmitting the AC bus power using a transformer 32.

Further, the method also comprises act S5: exchanging power between the AC bus 20 and a DC grid 30 using a third power converter 34, wherein the AC bus power transmitted by the transformer 32 is converted using the third power converter 34 into a DC grid power and/or vice versa.

At least the first DC unit 22 is formed as an energy generation unit, for example, a PV system 22 having at least one PV generator 24. A frequency and/or an amplitude of the AC voltage and/or of the AC current is set on the AC bus 32, and the third power converter 34 in FIG. 3 sets the DC grid power as a function of the AC bus power. In this case, the DC grid power can be specified and the third power converter ensures a balanced power inflow and outflow in the AC bus. The method is performed, for example, by a controller, which may be a portion of the energy supply system 10.

Figure 3:
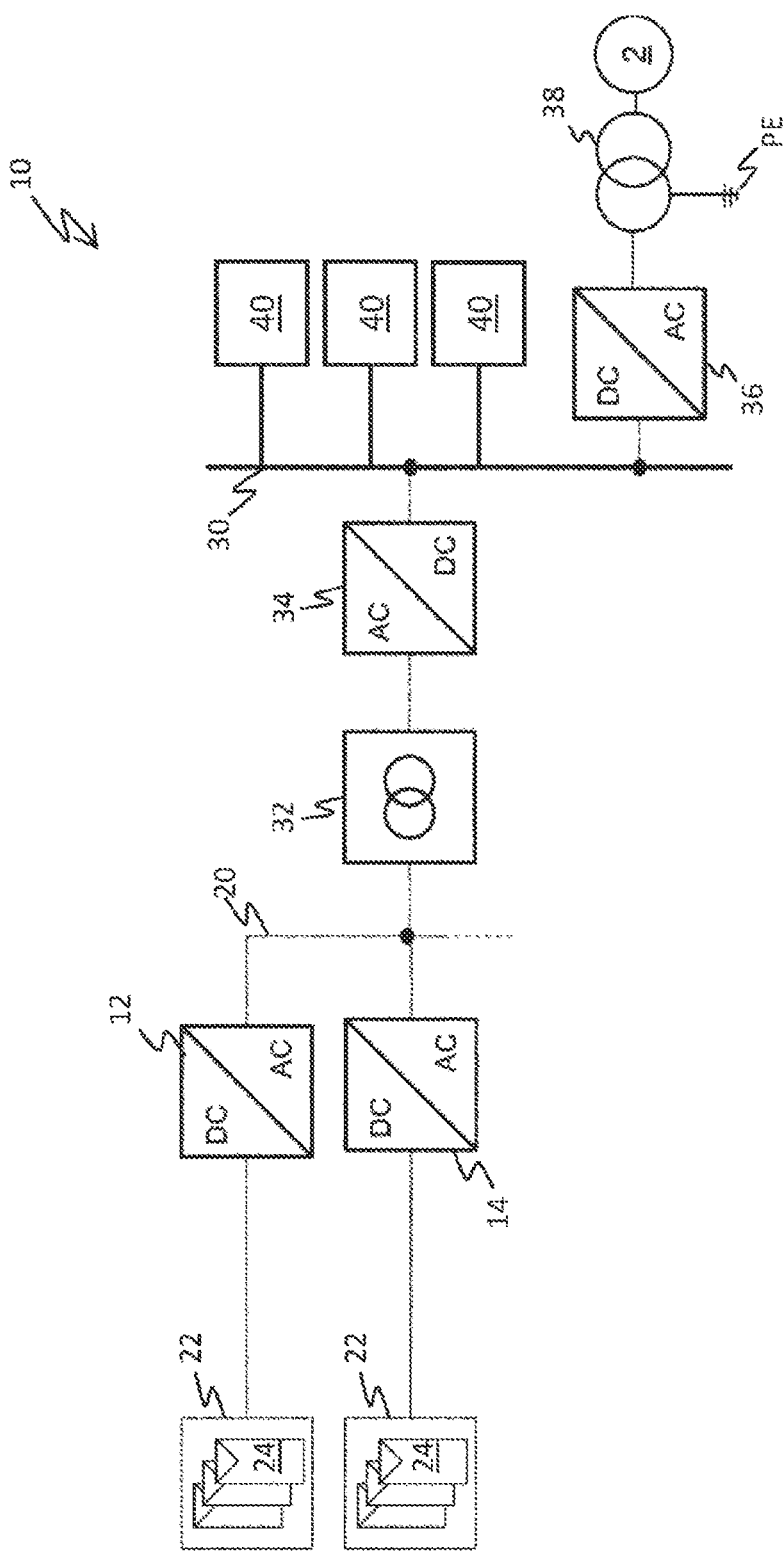
FIG. 3 schematically shows an embodiment of an energy supply system.

FIG. 3 schematically illustrates an embodiment of an energy supply system 10 having two PV systems 22. Each of the PV systems 22 has one or more PV generators 24. The DC power generated by each of the PV systems 22 is converted into AC power by a power converter 12, 14, which may be formed as an inverter, for each of the PV systems 22. The AC powers of the power converters 12, 14 are combined on the AC bus 20 as AC bus power. In addition to the two PV systems 22, further DC units can be connected to the AC bus 20 via further power converters. The AC power on the AC bus 20 is transmitted to the third power converter 34 via a transformer 32. The AC power transmitted via the transformer 32 is converted via the third power converter 34, which may be an active rectifier, into DC grid power that is exchanged with the DC grid 30 and is thus available to DC grid users 40. The DC grid 30 can be, for example, an industrial DC grid that can exchange power with a public AC supply grid 2 via a grid exchange converter 36. For this purpose, the grid exchange converter 36 may be connected on the AC side to the AC supply grid 2 via a transformer, for example, via a grounded medium-voltage transformer 38.

Such a design of the energy supply system 10 makes it possible to connect an energy generator 3 having a plurality of DC units 22 to the DC grid 30 without having to design the individual power converters 12, 14 with galvanic isolation. The galvanic isolation of the PV systems 22 from the DC grid 30 can be implemented, for example, using the transformer 32. This allows a more cost-effective implementation of a standard-compliant and safe energy supply system 10, since a plurality of DC units 22 can be connected to the DC grid 30 in a galvanically isolated manner using the galvanic isolation of the transformer 32, and can be operated and fused in a coordinated manner.

Figure 4:
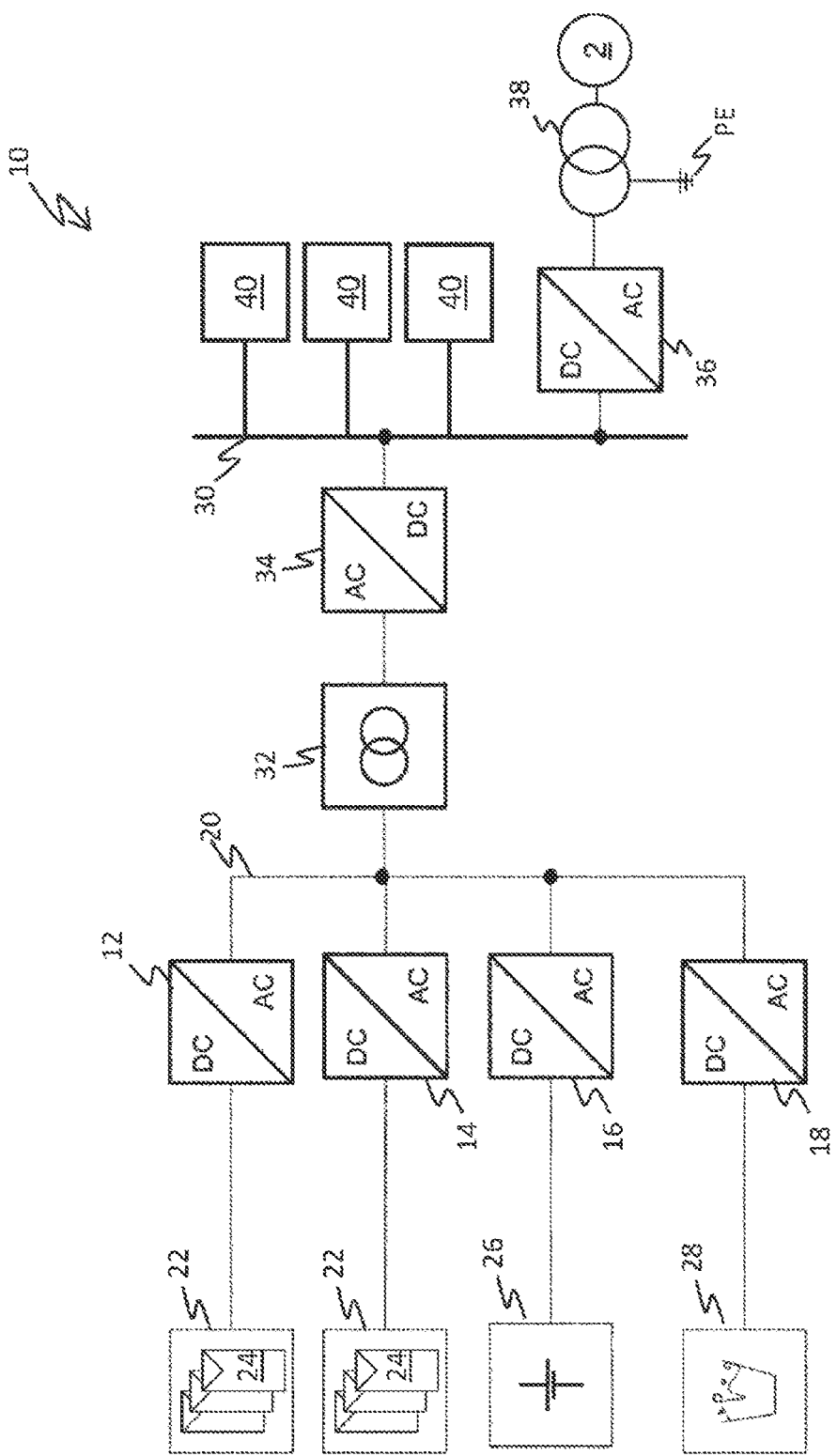
FIG. 4 schematically shows a further embodiment of an energy supply system.

FIG. 4 illustrates a further embodiment of an energy supply system 10. In addition to two PV systems 22 which are connected to an AC bus 20 via a first and a second power converter 12, 14, a store 26 for electrical energy is provided, which is configured, for example, as a battery and can store and deliver electrical energy. The store 26 is connected to the AC bus 20 via the power converter 16 and is capable of receiving electrical DC power during charging, and delivering electrical DC power during discharging, via the power converter 16. The power converter 16 is configured to convert the DC power of the store 26 into AC power and to exchange it with the AC bus 20. A DC consumer 28, for example, an electrolyzer, is further provided in the energy supply system 10. The DC consumer 28 may be supplied with electrical power from the AC bus 20 via the power converter 18.

On the AC bus 20, the electrical power exchanged with the AC bus by the power converters 12, 14, 16, 18 is combined into an AC bus power and transmitted to the third power converter 34 via the transformer 32. Via the third power converter 34, electrical power is exchanged with the DC grid 30, to which DC grid users 40 may be connected. The DC grid users 40 may be, for example, DC consumers or DC generators. Power can also be exchanged between the DC grid 40 and the AC supply grid 2 via the grid exchange converter 36 and optionally the medium-voltage transformer 38.

The DC units 22, 26, 28 are galvanically isolated from the DC grid 30 by the transformer 32. The galvanic isolation of the transformer 32 is sufficient for a large distance between the DC grid 30 and the energy generator 3 as well as a plurality of DC units 22, 26, 28, so that the power converters 12, 14, 16, 18 individually assigned to the DC units 22, 26, 28 can be designed without galvanic isolation.

On the AC bus 20, the AC voltage, for example, the amplitude and/or the frequency of the AC voltage, can be specified within certain limits and set accordingly. The values for this can be selected largely independently of the values which a public grid, for example, the AC supply grid 2, would require.

In one possible system design, the DC voltage in the DC grid 30 may be specified, for example, by specifications to an industrial DC grid. The DC voltage delivered by the PV systems 22 is generally specified by the design of the PV generators 24 and is also variable due to fluctuating solar irradiance. The operating voltages of the battery and/or electrolyzer may be specified by the units due to their design. The disclosed energy supply system 10 provides a number of degrees of freedom to couple these generally different operating voltages, i.e., the voltages in the energy generator 2 and the voltage in the DC grid. Examples of parameters that can be optimized in the system design to set a desired power flow between the energy generator 2 and the DC grid 1 and AC supply grid 3 in the most loss-free and efficient manner are the amplitude and/or the frequency of the AC voltage on the AC bus 20 and the transformation ratio of the transformer 32.

Control of an energy supply system 10 according to FIG. 3 or FIG. 4 is described below.

The DC voltage in the DC bus 30 is initially assumed to be given. The third power converter 34 is, in one embodiment, configured as a power electronic bridge circuit that is operated in a clocked manner, wherein the specific clocking sets a frequency of the AC-side voltage and a transformation ratio of the AC-side voltage relative to the DC-side voltage. Thus, the third power converter 34 determines the frequency and amplitude of the voltage in the AC bus 20 according to FIG. 3 and FIG. 4. The frequency may be fixed, e.g., set at 50 Hz or even 74.1 Hz, or may be variable within an adjustable range, e.g., within a permissible frequency band around a nominal frequency of, e.g., 60 Hz or even 41.3 Hz.

The voltage of the AC bus 20 specified in this way with respect to frequency and amplitude is detected by the power converters 12, 14, 16, 18 on the AC bus 20, and the power converters 12, 14, 16, 18 synchronize their feed with this AC voltage, i.e., they impress an AC current into the substantially given AC voltage in the AC bus 20.

In the embodiment shown in FIG. 3, the third power converter 34 can additionally be controlled such that the PV generators 24 are operated at an operating point of maximum power. For this purpose, the power converters 12, 14 can be operated with a fixed voltage transformation ratio, for example, with largely fixed clocking with optimum efficiency. A change in the AC voltage in the AC bus 20 caused by the third power converter 34 is thus passed from the power converters 12, 14 directly through to the PV generators 24 and produces a change in the operating point of the PV generators 24, i.e., the DC voltage of the PV generators 24 rises and falls with the set AC voltage in the AC bus 20. The third power converter 34 can now detect the currently converted electrical power as a function of the AC voltage and increase or decrease the AC voltage to maximize the power. Thus, the AC bus 20 sets the voltage at which the PV generators 24 deliver their maximum power, taking into account the transformation ratios of the power converters 12, 14. If it is necessary or desired to reduce the power fed into the DC grid 30 via the third power converter 34, for example, if there is an oversupply of DC power in the DC grid 30, the AC voltage in the AC bus 20 can be increased or decreased by the third power converter 34 to shift the operating point of the PV generators 24 towards idle or short circuit, and thus reduce the power compared to the operating point at maximum power.

An embodiment of the regulation of the energy supply system 10, which is applicable to the energy supply system 10 shown in FIG. 4, can make efficient use of the energy store 26 on the AC bus 20. In this case, the amplitude and the frequency of the AC voltage in the AC bus 20 are initially set by the third power converter 34. Setpoints are specified for the amplitude and the frequency of the AC voltage in the AC bus 20 for all power converters 12, 16, 34 involved, in one embodiment. Each power converter 12, 16, 34 has a specific P(f) or f(P) characteristic (see FIG. 5) which specifies the power P to be converted as a function of the current frequency f in the AC bus 20 or the frequency to be set as a function of the current DC grid power.

Specifically, characteristics P12, P14, P34 can be provided for the power converters 12, 14, 34 and, optionally, characteristics P16, P18 for the power converters 16, 18. An example embodiment of such characteristics is illustrated in FIG. 5. In FIG. 5, the horizontal axis shows the frequency f in the AC bus 20 and the vertical axis shows the power flow P in energy supply system 10, wherein positive values mean a power flow P in the direction of the DC grid 30 and vice versa.

In this example, the characteristic P34 of the third power converter has a constant gradient and intersects the frequency axis at a frequency f1. In this case, the third power converter 34 can deliver power from the AC bus 20 to the DC grid 30 at a frequency above a threshold f1 (rectifier mode) and feed power from the DC grid 30 to the AC bus 20 at a frequency below the threshold f1 (inverter mode). A specific specification for a power draw by the DC grid 30 or a withdrawal from the DC grid 30 can be made in a superordinate manner, for example, by aiming at a maximum utilization of regeneratively generated energy and/or by providing regulating power based on the stability requirements of the DC grid 30. Given a specific power exchanged via the power converter 34, the latter ascertains the frequency for the AC bus by means of the f(P) characteristic and then sets this frequency.

The power converters 12, 14 of the PV systems 22 can generally set the respective operating point of the PV generators 24 to their operating point of maximum power (known as maximum power point tracking, or MPP tracking for short). In the respective characteristic P12, P14, this occurs at frequencies below a threshold f2, so that the maximum possible PV power is fed into the AC bus 20 as long as the frequency is below the threshold f2. Above the frequency f2, the power delivered is reduced and reaches zero at a threshold f3.

The power converter 16 of the store 26 operates using a P(f) characteristic P16(*f*) which has a threshold f4 at which the store 26 does not exchange power. Below the threshold f4 the store 26 is discharged and above the threshold f4 the store 26 is charged.

In one embodiment, the frequencies f2, f3, f4 on the characteristics P12, P14, P16 are selected here in such a way that the PV systems 22 can, as far as possible, always deliver power—either via the AC bus 20 and the third power converter 34 into the DC grid 30 or via the AC bus 20 and the power converter 16 into the store 26. For example, at the frequency f4, the maximum possible PV power is transmitted to the DC grid 30, while no power is exchanged with the store 26.

Between the thresholds f2 and f3, the DC grid power according to characteristic P34 is less than the maximum possible PV power, which is nevertheless retrieved and partially transmitted via the third power converter 34 into the DC grid 30 and partially via the power converter 16 into the store 26.

At the threshold f1, there is no power transfer via the third power converter 34 and the PV power flows practically completely into the store 30. In this case, depending on the power capacity of the store 26 and the current irradiance on the PV systems 22, it may be necessary in one embodiment to reduce the PV power compared to the MPP power according to characteristic P12, P14.

The characteristics can be selected such that the store 26 can also be charged at a time when no PV power is available. For example, at the threshold f3, the third power converter 34 can specify, using the characteristic P34, a DC grid power which flows from the DC grid 30 via the third power converter 34 into the AC bus and from there is fed into the store 26 via the power converter 16 according to characteristic P16.

A consumer optionally additionally arranged in the energy supply system can be connected via a power converter 18, which comprises a characteristic P18 with the threshold f5. Below the threshold f5, the power converter 18 does not draw power from the AC bus 20, i.e., the power flow according to characteristic P34 is served by the store 26 and/or the PV systems 22. Above f5, the electrolyzer 28 is operated with a power according to characteristic P18 and draws a corresponding power from the AC bus 20, which, optionally when added to the DC power according to characteristic P16 from the store 26, results in the DC grid power according to characteristic P34.

Due to time-variable influences, the individual characteristics P12, P14, P34 and P16 and optionally P18 may change and/or, as a result, specified powers may not be implementable at certain frequencies, for example, due to varying irradiation on the PV systems 22 or the store 26 being too full or too empty. This can be taken into account by the method according to the application, in that the third power converter 34 dynamically adjusts the characteristic P34 if a setting of a specific frequency results in a power flow that deviates from the characteristic P34. For example, the higher the instantaneous MPP power of the PV systems 22, the greater the gradient of the characteristic P34 may be. Alternatively or additionally, the position of the thresholds f1-f5 can be adjusted, for example, by making the thresholds f1 and f3 coincide when the store 26 is not available, e.g., because it is fully charged.

The frequencies f1, f2, f3, f4, f5 can be coordinated with each other in such a way that stable and cost-efficient operation with predictable progression of the power exchanged between the AC bus 20 and the DC grid 30 is achieved without the need for a superordinate controller of the AC bus 20 or the power converters connected thereto. It is also possible to integrate further DC units into the AC bus 20, wherein the number of thresholds P(fn) can be increased accordingly in order to operate the further DC unit efficiently and in a coordinated manner as required. In this case, the frequency thresholds f1, f2, f(n) can be selected such that standardized protection technology and other components commonly used in AC grids can be adopted.

The transformation ratio of the transformer 32 may be selected such that all DC units 22, 26, 28 can exchange power with the AC bus 20. It must be taken into account that single-stage power converters can generally transfer power between a higher DC voltage and a lower AC voltage and vice versa, i.e., from a lower AC voltage to a higher DC voltage. In one embodiment, the transformer 32 can be arranged as close as possible to or integrated into the third power converter 34 for galvanic isolation, such that any widely branched cabling of the AC bus 20 is galvanically isolated from the DC grid 30.

What is claimed is:

1. A method for operating an energy supply system having at least one energy generation unit, comprising:
    exchanging power between a first DC unit and an AC bus using a first power converter, wherein a first DC power of the first DC unit is converted into a first AC power using the first power converter and vice versa,
    exchanging power between a second DC unit and the AC bus using a second power converter, wherein a second DC power of the second DC unit is converted into a second AC power using the second power converter and vice versa,
    combining the first AC power and the second AC power into an AC bus power of the AC bus,
    transmitting the AC bus power using a transformer,
    exchanging power between the AC bus and a DC grid using a third power converter, wherein the AC bus power transmitted by the transformer is converted using the third power converter into a DC grid power and vice versa,
    wherein at least the first DC unit comprises an energy generation unit comprising at least one PV generator,
    wherein a frequency and an amplitude of an AC voltage or of an AC current on the AC bus are set, wherein the third power converter sets the frequency on the AC bus as a function of the DC grid power and, for setting the AC voltage or the AC current, sets the DC grid power as a function of the AC bus power.

2. The method according to claim 1, wherein the first power converter operates the first DC unit at an operating point of maximum power and converts the first DC power into a first AC current and feeds it into the AC bus, wherein the first AC current follows the AC voltage in the AC bus.

3. The method according to claim 1, wherein the second DC power is generated, stored or consumed by the second DC unit, wherein the second DC power is converted by the second power converter into a second AC current and fed into the AC bus, wherein the second AC current follows the AC voltage in the AC bus.

4. The method according to claim 1, wherein the DC grid power is generated, stored or consumed by DC grid users connected to the DC grid.

5. The method according to claim 1, further comprising: exchanging power between the AC bus and a further DC unit using a further power converter, wherein a further DC power of the further DC unit is converted into a further AC power using the further power converter and vice versa.

6. The method according to claim 5, wherein the further DC power is generated, stored or consumed by the further DC unit.

7. The method according to claim 1, wherein the frequency on the AC bus is set by the third power converter using an f(P) characteristic as a function of the DC grid power.

8. The method according to claim 1, wherein the first and second DC power of the first and second DC units, respectively, is set by the respective power converter using a P(f) characteristic as a function of the frequency on the AC bus.

9. A device for exchanging electrical power in an energy supply system having at least one energy generation unit, comprising:
   an AC bus to which a first power converter and a second power converter are connected,
   wherein the first power converter is configured to convert a first DC power of a first DC unit into first AC power and vice versa, and wherein the second power converter is configured to convert a second DC power of a second DC unit into second AC power and vice versa, and
   wherein the first and second power converter are each connected on an AC side to the AC bus so that the first and second AC power are transmittable as AC bus power via the AC bus,
   wherein the device has a transformer arranged between the AC bus and an AC side of a third power converter,
   wherein the transformer is configured to transmit the AC bus power and to provide galvanic isolation,
   wherein the third power converter is configured to convert the transmitted AC bus power into DC grid power and vice versa, and
   wherein, on a DC side of the third power converter, a DC grid is connected in which DC grid users are operated with the DC grid power,
   wherein at least the first DC unit comprises an energy generation unit having at least one PV generator,
   wherein the third power converter is configured to set a frequency and an amplitude of an AC voltage or an AC current on the AC bus,
   wherein a control circuit of the third power converter sets the frequency on the AC bus as a function of the DC grid power and sets the DC grid power as a function of the AC bus power.

10. The device according to claim 9, wherein the first power converter is configured to operate the first DC unit at an operating point of maximum power and to convert the first DC power into a first AC current and to feed it into the AC bus, wherein the first AC current follows the AC voltage in the AC bus.

11. The device according to claim 9, wherein a further DC unit is connected to the AC bus via a further power converter, wherein the further power converter is configured to convert a further DC power of the further DC unit into a further AC power and vice versa.

12. The device according to claim 11, wherein the second and the further DC unit are configured to generate, store or consume the respective DC power.

13. The device according to claim 9, wherein the transformer is grounded on its side connected to the AC bus.

14. The device according to claim 9, wherein the control circuit is at least partially implemented by the first, the second or the third power converter.

15. The device according to claim 9, wherein the controller is at least partially implemented outside the device.

16. An energy supply system comprising a device according to claim 9, having:
   a first DC unit which is formed as a first PV system having at least one PV generator,
   a second DC unit which is formed as a second PV system having at least one PV generator or formed as an energy store, and
   a DC grid to which DC grid users are connected for drawing DC grid power and a superordinate AC supply grid for supplying the DC grid.

17. The energy supply system according to claim 16, having the controller, which is configured to receive a setpoint for the DC grid power and to operate the first power converter, the second power converter or the third power converter such that the DC grid power corresponds to the setpoint.

* * * * *